US007616582B2

(12) United States Patent
Jeffery et al.

(10) Patent No.: US 7,616,582 B2
(45) Date of Patent: Nov. 10, 2009

(54) SYSTEM AND METHOD FOR SELECTING DATA PROVIDERS

(75) Inventors: Richard I M Jeffery, Suffolk (GB); Matthew D Walker, Suffolk (GB); Othon Kamariotis, Athens (GR)

(73) Assignee: British Telecommunications public limited company, London (GB)

( * ) Notice: Subject to any disclaimer, the term of this patent is extended or adjusted under 35 U.S.C. 154(b) by 309 days.

(21) Appl. No.: 10/555,276

(22) PCT Filed: Jul. 30, 2004

(86) PCT No.: PCT/GB2004/003331

§ 371 (c)(1),
(2), (4) Date: Nov. 2, 2005

(87) PCT Pub. No.: WO2005/018158

PCT Pub. Date: Feb. 24, 2005

(65) Prior Publication Data

US 2006/0245367 A1 Nov. 2, 2006

(30) Foreign Application Priority Data

Aug. 15, 2003  (GB) ................................. 0319251.5

(51) Int. Cl.
*G01R 31/08* (2006.01)
(52) U.S. Cl. ...................................... 370/249; 370/252
(58) Field of Classification Search ................. 370/249, 370/241, 244, 252, 254, 259, 468, 248; 709/203
See application file for complete search history.

(56) References Cited

U.S. PATENT DOCUMENTS

| 5,953,350 | A | * | 9/1999 | Higgins ....................... 370/524 |
| 6,016,307 | A | * | 1/2000 | Kaplan et al. ................ 370/238 |
| 6,023,455 | A | * | 2/2000 | Takahashi .................... 370/249 |
| 6,332,157 | B1 | * | 12/2001 | Mighdoll et al. ............ 709/217 |
| 6,452,922 | B1 | | 9/2002 | Ho |
| 6,502,125 | B1 | | 12/2002 | Kenner et al. |
| 6,560,334 | B1 | | 5/2003 | Mullaney et al. |

(Continued)

FOREIGN PATENT DOCUMENTS

DE        10125017 A1    12/2002

(Continued)

OTHER PUBLICATIONS

International Search Report—Sep. 28, 2004.

*Primary Examiner*—Kwang B Yao
*Assistant Examiner*—Candal Elpenord
(74) *Attorney, Agent, or Firm*—Nixon & Vanderhye PC

(57) ABSTRACT

A preferred data provider is selected from a plurality of data providers by receiving a request for data from a client together with client identification data, identifying a plurality of data providers capable of providing data to the client, providing the client identification data to the data providers and instructing the data providers to perform tests in order to establish a measure of the elapsed time for a signal to be sent to and received from the client, and a measure indicative of their remaining capacity for data transfer, and to make these measures available to the system. One or more preferred data providers may then be selected on the basis of the elapsed time signals and the remaining capacity signals from the data providers.

18 Claims, 2 Drawing Sheets

U.S. PATENT DOCUMENTS

| | | | |
|---|---|---|---|
| 6,590,869 B1 * | 7/2003 | Beyda et al. | 370/248 |
| 6,704,288 B1 * | 3/2004 | Dziekan et al. | 370/248 |
| 6,711,135 B1 * | 3/2004 | Dziekan et al. | 370/242 |
| 7,111,061 B2 * | 9/2006 | Leighton et al. | 709/224 |
| 7,340,505 B2 * | 3/2008 | Lisiecki et al. | 709/217 |
| 2001/0056493 A1 * | 12/2001 | Mineo | 709/227 |
| 2002/0102978 A1 * | 8/2002 | Yahagi | 455/437 |
| 2003/0108001 A1 * | 6/2003 | Roy | 370/260 |
| 2003/0145007 A1 | 7/2003 | Kenner et al. | |

FOREIGN PATENT DOCUMENTS

| | | |
|---|---|---|
| WO | WO 01/89142 A2 | 11/2001 |
| WO | WO 02/095637 A2 | 11/2002 |

* cited by examiner

SYSTEM AND METHOD FOR SELECTING DATA PROVIDERS

This application is the US national phase of international application PCT/GB2004/003331 filed 30 Jul. 2004 which designated the U.S. and claims benefit of GB 0319251.5, dated 15 Aug. 2003, the entire content of which is hereby incorporated by reference.

BACKGROUND

1. Technical Field

The present invention relates to the identification, prior to or during the transfer of data, of suitable communications channels for transferring data. Embodiments of the present invention may be applicable in situations where a user wishes to receive data such as video data by way of Video Streaming for example, or prior to or during the downloading of multimedia content over any of a variety of means such as xDSL, Wireless LAN, mobile etc.

2. Related Art

Of the many uses of networks such as the internet, one category of use that has been gaining significantly in popularity recently has been the use of networks for the exchange of data such as video or audio data or other media content. Increasingly, types of multimedia content (e.g. Video, Audio) are available in large quantities on the Internet. This Multimedia content can be streamed over a variety of IP Networks, either broadband or narrowband. More generally, data distribution may be achieved by way of data streaming or more general forms of downloading. Such distribution may be carried out in a peer-to-peer context, or from commercial multimedia-providing servers, and may be carried out using a variety of means such as xDSL, Wireless LAN, cable, mobile (GPRS or 3G) etc. It should be noted that xDSL covers many different variations of DSL ("Digital Subscriber Line"), such as ADSL ("Asymmetric"), HDSL ("High bit-rate"), and RADSL ("Rate-Adaptive"). Digital Subscriber Line technology is a well-known technology for bringing high-bandwidth information to homes and small businesses over ordinary telephone lines.

Unfortunately, receiving data from the Internet can sometimes be problematic, due to factors such as Packet Loss, Packet Delay, Jitter, a Server being down, and other factors, which severely affect time-critical applications such as Video Streaming. Often, a user tries to connect to a Server and finds either that this Server is down or severely busy, thus refusing video content. If the user does manage to connect to a server and the video content is finally being streamed, the quality may be very bad due to factors such as packet delay, referred to above. All these factors severely affect an end-user's experience, particularly with regard to receiving streamed audio or video data over the Internet, and have thus delayed the take-up of these kinds of applications.

For an individual user who wishes to download large files or other items, or perhaps to receive streamed data relating to a particular file or files, there may be a large number of different data providers, such as commercial servers or peers, who may be able to provide the required data. On account of the variety of means by which the user may be connected to the network, the variety of types of data providers from which data may be sourced, and other factors, the individual user may encounter the problem of not knowing which data provider, from a "pool" of available data providers such as Video Servers, will be capable of serving video content or other such data over a reliable connection. Low reliability may be caused by packet loss, jitter, packet delay, and other factors, all of which lower the chances of achieving good quality downloading or data streaming.

In order to give an idea of how important it is to solve that problem, some "well-known" applications are mentioned below:

1) Peer-To-Peer applications like "Napster" (a music file-sharing web-site that has now been shut down) and "Kazaa" (www.kazaa.com).
2) Video Streaming Content providers, where a number of video servers are set-up somewhere on the network.

With reference to video servers, to which the present invention is of particular applicability, the usual approach to this problem has been to pick a default video server without any prior knowledge of which Server will provide the most reliable connection, which is dependent on where the end-user is located on the network, however some techniques already exist for choosing a server which is likely to be faster or better in some way.

Summaries of some related papers are given below:

"Measurement study of peer-to-peer file sharing systems":
Authors: Saroiu S, Gummadi P K, Gribble S D (Dept. of Comput. Sci. & Eng., Washington Univ., Seattle, Wash., USA),
Multimedia Computing and Networking 2002, 23-24 Jan. 2002, SPIE-Int. Soc. Opt. Eng, Proceedings of the SPIE—The International Society for Optical Engineering, vol. 4673 pp 156-70

Summary:

The popularity of peer-to-peer multimedia file sharing applications such as Gnutella and Napster has created a flurry of recent research activity into peer-to-peer architectures. This paper includes a detailed measurement study of the two popular peer-to-peer file sharing systems, namely Napster and Gnutella, and in particular seeks to characterise the population of end-user hosts that participate in these two systems. This characterisation includes the bottleneck bandwidths between these hosts and the Internet at large, IP-level latencies to send packets to these hosts, how often hosts connect and disconnect from the system, how many files hosts share and download, the degree of co-operation between the hosts, and several correlations between these characteristics.

"Handling multimedia objects in peer-to-peer networks":
Authors: Kalogeraki V (HP Labs., Palo Alto, Calif., USA), Delis A, Gunopulos D, Proceedings CCGRID 2002. 2nd IEEE/ACM International Symposium on Cluster Computing and the Grid, 21-24 May 2002, IEEE Comput. Soc pp 438-9

Summary:

This paper attempts to explain how the furnishing of video services on a peer-to-peer (P2P) network can not only offer viable alternatives to the mostly proprietary architectures used today for the delivery of video services, but it can also be done in a reliable and scalable manner. Building upon the approach of ad-hoc P2P networks of resources, a new architecture that can support the storage and retrieval of movies and/or video clips is proposed. The proposed configuration exploits the availability of high-performance links to networks, the usage of exclusive and partial indexing in peers, making nodes "aware" of the content in their own vicinity, replication of objects and caching of popular items, as well as full connectivity among servers whenever feasible. The architecture claims to use efficient indexing mechanisms for the retrieval of the multimedia objects, guarantees continuous operation in light of server failures and allows for the transparent population of new servers as well as the evolution of the furnished services and/or network resources with minimal disruption to the users. One key provision to realise such a P2P infrastructure is that the core peers (or servers) are expected to be linked via a low-latency and high-bandwidth network that is capable of effectively handling and delivering voluminous multimedia data. It is also anticipated that end-users should have sufficient connections to object servers.

"Peer-to-peer streaming media delivery": Author: Stolarz D, Proceedings First International Conference on Peer-to-Peer Computing, 27-29 Aug. 2001, IEEE Comput. Soc pp 48-52

Summary:

Whatever definitions have been put upon it, peer-to-peer is said to be an effective rallying cry for a new way of doing things. Streaming media delivery is particularly susceptible to a peer-to-peer architectural approach. Peer-to-peer systems have been shown to reduce the bandwidth cost and increase the scalability of on-demand and streaming content on the Internet. Similar techniques can be used to create a "virtual multicast", an application-layer implementation of the efficient sub-net broadcast features of network-layer multicasting.

"On peer-to-peer media streaming": Authors: Dongyan Xu, Hefeeda M, Hambrusch S, Bhargava B (Dept. of Comput. Sci., Purdue Univ., West Lafayette, Ind., USA) Proceedings 22nd International Conference on Distributed Computing Systems, 2-5 Jul. 2002, IEEE Comput. Soc pp 363-71

Summary:

In this paper, a peer-to-peer media streaming system is studied with the following characteristics: (1) its streaming capacity grows dynamically; (2) peers do not exhibit server-like behaviour; (3) peers are heterogeneous in their bandwidth contribution; and (4) each streaming session may involve multiple supplying peers. Based on these characteristics, two problems are investigated: (1) how to assign media data to multiple supplying peers in one streaming session and (2) how to quickly amplify the system's total streaming capacity. The solution proposed to the first problem is an optimal media data assignment algorithm $OTS_{p2p}$, which results in minimum buffering delay in the consequent streaming session. The solution to the second problem is a distributed differentiated admission control protocol $DAC_{p2p}$. By differentiating between requesting peers with different outbound bandwidth, $DAC_{p2p}$ is said to achieve fast system capacity amplification; benefits all requesting peers in admission rate, waiting time, and buffering delay; and creates an incentive for peers to offer their truly available out-bound bandwidth.

Referring now to background patent literature, a system for server-side optimisation of data delivery is disclosed in U.S. Pat. No. 6,112,239 (Kenner et al). Similar systems are disclosed in U.S. Pat. No. 6,502,125 and US 2003/0145007 (both also Kenner et al). In these systems, users are provided with software which must be executed from their own machines in order to perform the optimisation. Similarly, in U.S. Pat. No. 6,477,522 (Young), a system for optimising the downloading of files from the internet is disclosed in which an applet intercepts the request for the file and determines the best server to provide the file. Again, it is necessary for software to be installed in, and executed from, the user's machine.

With reference to the field of digital electronic game-playing between users connected via the internet, U.S. Pat. No. 6,304,902 (Black et al) discloses a method for ensuring that the quality of data communications links between several game-playing users and any necessary server or servers is adequate for such game-playing. Game-playing generally involves two-way exchange of information between multiple players and a common server, which may be selected from a plurality of possible servers. One server acts as a matchmaker, and selects a few servers from the plurality of possible servers, and from these selects one as the server for the requested game. It will be noted that on account of the nature of such game-playing systems, the aim is to allow several users to connect to the same server concurrently, so a server is chosen in such a way as to facilitate its use by several users who may attempt to connect to it concurrently or one shortly after another.

SUMMARY

Contrary to the above, present exemplary embodiments aim to identify the "fastest", "nearest" or otherwise most appropriate server for an individual user, or the fastest, best or most reliable connection, in order that a connection may then be established by that individual user to a server that is not only appropriate for the multimedia content download or other such data exchange required by that user, but that is least likely to be slowed down or overloaded due to it also providing data to a large number of other users. According to preferred embodiments, this identification process may be carried out without the user needing to install or execute specific software on his or her own machine.

According to the present exemplary embodiment there is provided a system for selecting a preferred data provider from a plurality of data providers, the system comprising:

means for receiving a request for data from a client;

means for receiving client identification data from said client;

means for identifying a plurality of data providers capable of providing data to said client;

means for providing said client identification data to said data providers;

means for instructing said data providers to perform the steps of:

(i) sending a test signal to said client;

(ii) receiving a return signal from said client;

(iii) obtaining a measure of the elapsed time between the sending of the test signal and the receipt of the return signal;

(iv) making a signal indicative of the elapsed time available to the system; and (v) making a signal indicative of their remaining capacity available to the system;

means for receiving elapsed time signals and remaining capacity signals from said data providers;

means for selecting a preferred data provider on the basis of said signals; and means for providing information relating to the identity of said preferred data provider to said client.

According to the present exemplary embodiment, there is also provided a method for selecting a preferred data provider from a plurality of data providers, the method comprising the steps of:

receiving a request for data from a client;

receiving client identification data from said client;

identifying a plurality of data providers capable of providing data to said client;

providing said client identification data to said data providers;

instructing said data providers to perform the steps of:
(i) sending a test signal to said client;
(ii) receiving a return signal from said client;
(iii) obtaining a measure of the elapsed time between the sending of the test signal and the receipt of the return signal;
(iv) making a signal indicative of the elapsed time available to the system; and
(v) making a signal indicative of their remaining capacity available to the system;

receiving elapsed time signals and remaining capacity signals from said data providers;

selecting a preferred data provider on the basis of said signals; and providing information relating to the identity of said preferred data provider to said client.

By using systems and methods according to presently described embodiments, it is possible to solve the problems outlined above by running a small testing process which may be completely invisible to the end-user and which does not require the installation or execution of any specific software on the user's machine, when the user wishes to try to access video content or other data, thus determining from a number of available Video Servers or other data providers the most reliable, fastest, least congested or otherwise most appropriate one for the particular user. In this way, the user may receive the best possible data download or data stream by connecting to the most "reliable" one, thus enhancing the user's experience in relation to multimedia and other such applications.

According to preferred embodiments, the system may be arranged to receive requests for specific items, such as specific video files, from the user. It may then carry out a search in order to identify data providers capable of providing the specific items requested, possibly of a group of data providers who may be pre-selected, or who may be subscribers to the system, or possibly of the whole internet or other such network. Following such a search, the system may perform the selection process in order to make a selection just from these potential data providers. Alternatively the user need not be asked to specify a particular item in order for a "preferred" data provider to be selected. In such cases, however, the user may find him- or herself limited to a "catalogue" of items that the preferred data provider, once selected, can provide, which may or may not include a specific item that the user wishes to request.

In systems according to preferred embodiments, the means for instructing said data providers is a means remote from the client, such as a centralised server. The term "remote" need not imply that the instructing means and the client are geographically distant, but merely that the respective functions of the client and the instructing means are not performed by a common processing means on a client machine. It will be clear that irrespective of the respective physical locations of the client and the server, something other than the client performs the "instructing", thus there is no need for software to be downloaded to a client machine.

Systems according to embodiments may be arranged to select a preferred data provider only from data providers having a remaining capacity above a predetermined threshold, effectively disqualifying any data providers whose remaining capacity is below that predetermined threshold. Alternatively, the final selection may be made in order to obtain the best balance between the respective factors represented by the two types of signals (i.e. elapsed time and remaining capacity) without the decision being constrained by specific thresholds.

According to preferred embodiments, the signal indicative of remaining capacity that data providers may be instructed to provide may be a signal indicative of their remaining bandwidth.

In systems according to preferred embodiments, in order to provide the information relating to the identity of the preferred data provider, the system may arranged to provide the information on a web site, which may be updated whenever the selection process has been carried out and a new "preferred" data provider established. The information may be provided in the form of the Uniform Resource Locator (URL) of the preferred data provider. The information may be provided in other ways, however, such as the sending OT an e-mail or other such message containing the necessary information to the user.

Systems according to embodiments may select more than one "preferred" data provider. In this case, they may provide information relating to a plurality of preferred data providers to user, possibly int he form of a list indicating a ranking, based on the order in which they performed in the respective tests (i.e. best, second-best etc.) or alternatively, any that performed above predetermined quality thresholds may be identified to the user.

Reference will be made to the following technologies in the description of preferred embodiments: RMI, JAVA, Servlets, HTML. Information about these technologies is publicly available, but a brief summary is given here for the purposes of avoiding the possibility of ambiguity in relation to the terminology, and the abbreviations and acronyms associated therewith.

RMI ("Remote Method Invocation") is a new Application Programming Interface (API) offered in Java Development Kit (JDK) 1.1 that allows for messaging between different Java Virtual Machines (JVMs), even if they are separated by a network.

"JAVA" is a programming language expressly designed for use in the distributed environment of the Internet. It can be used to create complete applications that may run on a single computer or be distributed among servers and clients in a network. It can also be used to build a small application module or "applet" for use as part of a Web page. Applets make it possible for a Web page user to interact with the page.

A "Servlet" can be defined as a small program that runs on a server. The term usually refers to a Java applet that runs within a Web Server environment. This is analogous to a Java applet that runs within a Web Browser environment.

HTML ("Hypertext Markup Language") is the set of symbols or codes inserted in a file intended for display on a World Wide Web browser page. The "Markup" tells the Web browser how to display a web page's words and images for the user.

BRIEF DESCRIPTION OF THE DRAWINGS

Further features and advantages of the present invention will become apparent from the following description of embodiments thereof, presented by way of example only, and by reference to the accompanying drawings, wherein like reference numerals refer to like parts, and wherein.

DETAILED DESCRIPTION OF EXEMPLARY EMBODIMENTS

Figure 1:
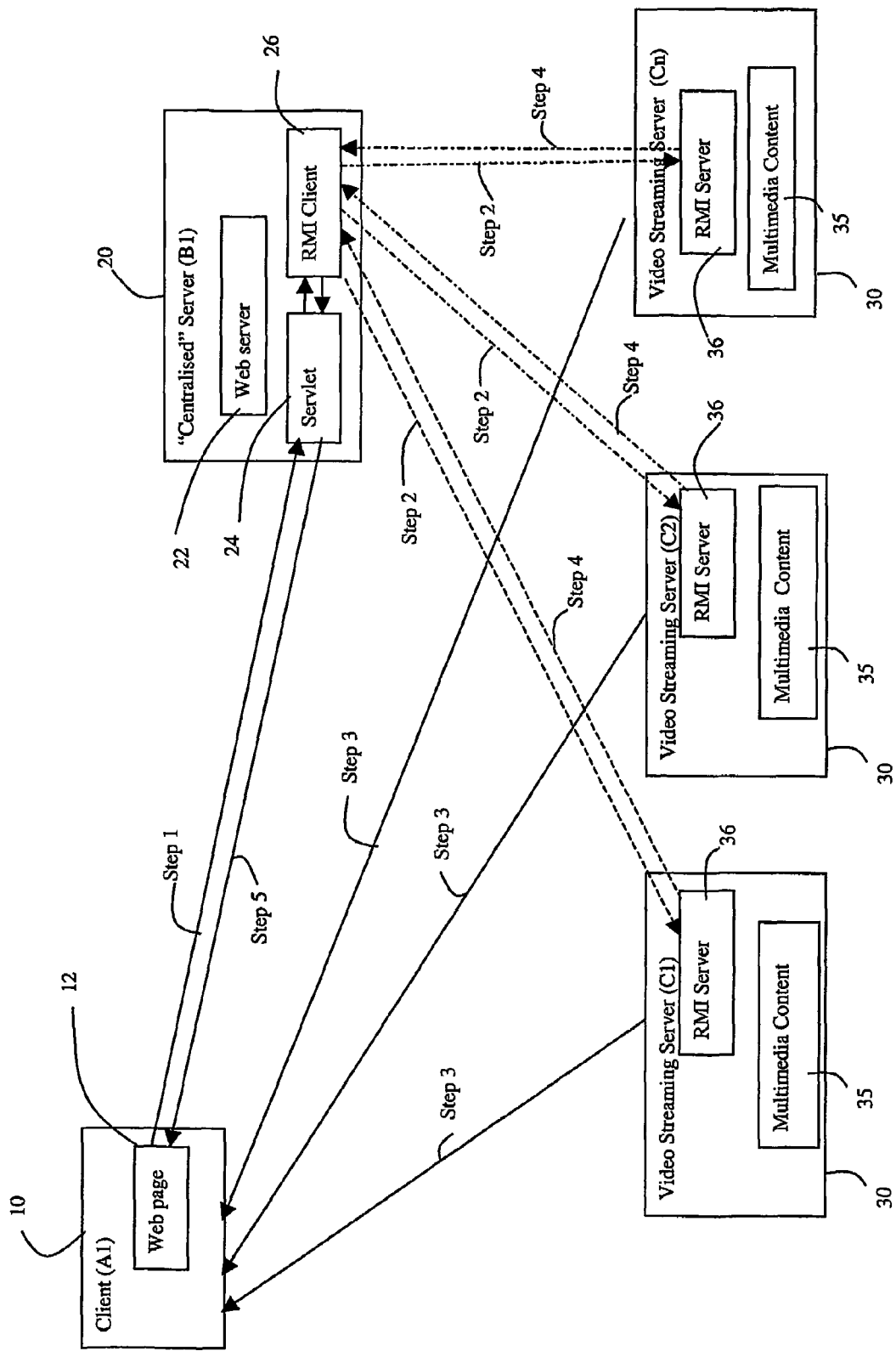
FIG. 1 is an illustration showing the component parts of a network including a system according to an embodiment of the present invention.

A network including a system according to an embodiment of the present invention is shown in FIG. 1. This figure demonstrates the interactions between components of the network which may occur in the process of determining a preferred, or the "best", Video Server. Part of this is typical architecture used for video streaming (Client, Web Server, Video Server) but it also includes the JAVA RMI running, which allows the testing to be done in order to determine which "Video Server" is the most suitable for Video Streaming for a specific end-user. The process will be described in detail below. The steps in the figure indicate the preferred order of events. The components of the system can be summarised as follows:

The Client: The "Client" 10 generally refers to the "end-user's" personal computer (PC), running a web browser and "Video Player" or a similar plug-in or application. It will be noted that the client could however be a device such as a 3G ("Third-Generation") mobile phone, using WAP (Wireless Application Protocol) or similar web browsing protocols to interact with the internet, for example.

The Centralised Server: The "Centralised Server" 20 generally refers to a computer terminal such as a PC, comprising a Web Server 22 running web server software. The Centralised Server 20 may thus provide or present information to the user in the form of a web page, from which the user may make a choice of video clips, for example, the web page containing links to video streaming server sites. The Centralised Server may run "Servlet" (JAVA) software 24 or "ASP" (Microsoft) software, responsible for creating dynamic web pages and communicating with RMI servers, and finally, running JAVA RMI client, in order to communicate with "RMI servers" installed in any of a plurality of "Video Streaming Servers".

The Centralised Server 20 may thus initially present a dynamic web-page to the user. Prior to the Centralised Server operating in any "search" mode in which it aims to find the "best" (i.e. the fastest, nearest or otherwise most appropriate) server or servers, it may contain links to one or more "default" servers. At any point, the user may choose, or send a request for, a piece of content—if this occurs before any search has been completed, a default streaming server may then be chosen to deliver the content, or a link to one or more default servers may be provided.

Video Streaming Servers: A plurality of "Multimedia Servers" or "Video Streaming Servers" 30 are shown (in this example, three such servers are shown, identified as "C1", "C2" and "Cn"), each of which contains, or has access to, stored "Multimedia Content" 35 such as "Video Content", compressed or uncompressed, an "RMI Server" 36 which communicates with the "RMI Client" 26 in the Centralised Server 20, and suitable software capable of serving "Video Streaming Content" to end-users such as the Client 10. They are also provided with means for carrying out a "Ping" test, as will be explained later, and for establishing a value, which may be an average value, for a "round-trip response-time" as will be described in more detail later, and providing this to the Centralised Server.

All of these components may interact in order to deliver video streaming content to end-users, as will be explained later.

The process of determining the "best" (or at least a "preferred") Server is described below. It will be understood that while "best" is a subjective term, two factors which are of great importance in data transfer are speed and reliability. Any improvement in relation to either of these factors can be regarded as an improvement in the overall quality of the download. There are two principal aspects to the process, which will be referred to as follows:

(a) a "Latency" test; and
(b) a "Remaining Bandwidth" test.

The tests can be carried out one after the other in either order, or contemporaneously. They will be described in the following paragraphs.

a) Latency Test

Step 1 (shown in FIG. 1): The "Client" or "User" 10 submits a request for connection to a "Multimedia Server", via a "Centralised" Server 20, which is responsible for the co-ordination of the entire "search" process for multimedia servers. This Centralised Server 20 contains a "Servlet" 24, which is capable of retrieving the IP address of the "Client" or "User" machine 10 in order that it may propagate this IP address to a number of Multimedia Servers 30, using "JAVA RMI" technology for example. The user may make a request for specific data, or a specific item, such as a specific video file for example, in which case the Centralised Server may carry out a search for Video Servers capable of providing that data, item or file before continuing with the process of determining the "best" Server from those that are found to be capable thereof. Alternatively, the user's request may be for data in general, in which case the Centralised Server may carry out the process of determining the "best" Server from a set of servers, predetermined or otherwise, in which case the user may be allowed to select which item or items to receive from the preferred server once the identity of that preferred server has been established, once that server has provided a "library" of available items to the user, for example.

Step 2 (shown in FIG. 1): As referred to above, the IP address retrieved from the "Client" or "User" machine 10 is propagated from the "RMI Client" 26 of the Centralised Server 20 to the "RMI Servers" 36 of the Multimedia Servers 30.

Step 3 (shown in FIG. 1): Each "RMI Server" 36 located in a "Video Streaming Server" 30 will retrieve that IP address, and each one will send a test signal by "PING-ing" the "User" machine 10, using that IP address. "Ping" refers to the application software "Packet INternet Gophers" which may be used to operate the process of sending Internet Control Message Protocol (ICMP) packets from a "Video streaming Server" machine to a "Client" machine, and in this way, it is possible to measure the time it takes for a packet to travel from that "Video Streaming Server" machine 30 to a "Client" machine 10 and return to the Video Streaming Server. Generally, The more successful packets received back (if more than one is sent) and the less time (generally to be measured in milliseconds) it takes for a packet to travel from a specific "Video Streaming Server" machine to the Client machine and back, the better the video-streaming performance that end-user is likely to get if connected to that "Video Streaming Server". At this point, it should be mentioned that a packet may be considered "unsuccessful", if a "Request Timeout Response" message is received after the "Ping" process for some packets. In this case, the packet is considered "lost" and a default value (usually 1000 ms), may be given, thus affecting the "average" value calculated at the end.

While it is particularly advantageous to utilise the "Ping" test as above, in particular because it requires no extra software to be installed on the user machine, alternatives do exist for measuring latency. These alternatives include known network tools such as "Traceroute" and "Ping" equivalents suitable for protocols other than ICMP, such as UDP ("User Datagram Protocol").

Step 4 (shown in FIG. 1): After the "Pinging" process, in each machine, has been completed, an average value is calculated and this value is returned back to the "Centralised" Server, using RMI again. Thus, a "table" with "average" response value times, like the ones shown in Table 1 will be formed in the "RMI Client". From all these values, the smallest one (i.e. Server C1 in this case) may be chosen as the preferred, or most suitable "Video Streaming Server" (or "best" Server).

TABLE 1

This shows the average values retrieved from all "Video Streaming Servers" with RMI technology. The "RMI Client" may pick the smallest value (i.e. Server C1).

| IP address (Video Streaming Server) | Average "response time" value (milliseconds) |
|---|---|
| C1: 132.146.107.61 | 57 ms |
| C2: 132.146.107.124 | 1000 ms |
| Cn: 132.146.107.16 | 540 ms |

Step 5 (shown in FIG. 1): The "Serviet" then retrieves from the "RMI Client" the IP address of the "Video Streaming Server" with the smallest "average response time". In the above example this is "C1" with IP address "132.146.107.61". It may update the web page containing the video links with that new IP address. In this way, the "Centralised" server will redirect the client to that "multimedia" Server, via JAVA "Servlet" technology.

This is the end of the latency test. The entire process as set out above may be invisible to the end-user, may take only a few seconds to be completed and by selecting on the basis of this test alone a Server may be selected from which the user may get video streaming content from a "preferred" "Video Streaming Server".

The above process can be repeated after specific periods of time set by the "Video Server" administrator for example, and each time the web page can be dynamically refreshed with a new preferred "Video Streaming Server" IP address.

b) Remaining Bandwidth Test

Figure 2:
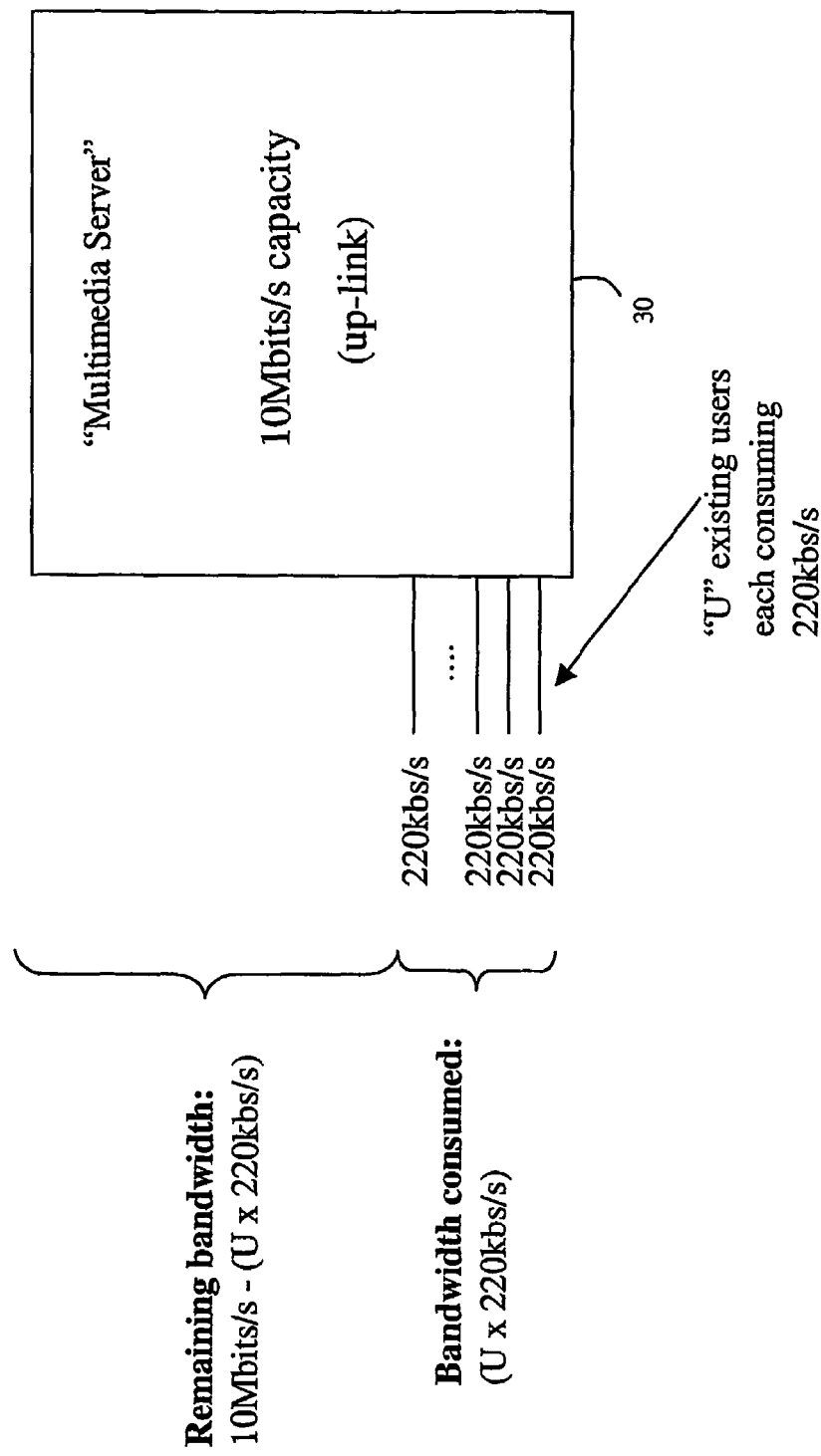
FIG. 2 shows the calculation of the remaining "up-link" capacity of a "Data Provider".

While the system as described above is capable of establishing a preferred server on the basis of the results of the "latency test" alone, systems according to embodiments of the invention are also capable of performing a further test, which will be referred to as the "Remaining Bandwidth Test". This allows a server to be "disqualified" from being chosen as the preferred server if it is currently "congested", due to being used by a significant number of other users, or due to a high proportion of its bandwidth already being assigned to other tasks. FIG. 2 illustrates the calculation of the remaining "up-link" capacity in a "Server", for a specific period of time.

Step 3a (not shown in FIG. 1): Preferably, but not necessarily, at the same time as Step 3 of the "Latency Test", the "RMI Servers" 36 of each of the Multimedia Servers 30 may obtain from the "Video streaming software" a value U for the number of other users already connected to that Multimedia Server, and for each one, the "bit-rate" B of the clip requested. With reference to FIG. 2, the bit-rate of each of the U existing users is shown, for the sake of simplicity, as being 220 kilobits per second, although the bit-rates of existing users need not be the same. Such information could be programmatically retrieved, using "plug-in" libraries like the "Windows Media SDK" tools from "Microsoft", or similar tools from other companies (RealVideo, QuickTime, etc).

The formula below will give the total bandwidth consumed at the time of the request from the "RMI Server":

$$N_{total} = \sum B_i, \text{ where } i = 0, 1, 2, 3, \ldots U \quad (F.1)$$

where:

$N_{total}$ is the Total Bandwidth consumed by the requested "Video streams", at the time the request from the "RMI server" took place.

$B_i$ is the Encoding "Bit-Rate" of the requested "video clip", for the $i^{th}$ "User".

U is the Number of connected "Users" to the "Video Streaming Server"

At the same time, the "RMI Server" may establish the maximum available "upstream" bandwidth for a "Video Streaming Server" limited by the network connection. This could be either set by the "administrator" manually, when he installs the entire software, or it could be retrieved automatically, from a process running locally on the machine, which determines the maximum "up-link" connection bandwidth.

Thus: $X_{max}$ is the maximum available "upstream" bandwidth.

Finally, the formula below will give us the "percentage" of available "up-link" bandwidth:

$$A = [(X_{max} - N_{total})/X_{max}] * 100\% \quad (F.2)$$

where A is the percentage of remaining "up-stream" bandwidth

In this way, we can set a "threshold", of 10-20% for example, such that if A is below the threshold, we can assume that this "Video Streaming Server" is almost congested, thus it will not be included in the final "best Video streaming Server" decision (Step 4).

Below an example is given to explain the formulas above:

Let us take, for example, a situation where there are two clips encoded in a "Video Streaming Server": The first file is called "videofile1" and has an encoding bit-rate of 220 kbps. The second is called "videofile2" and has an encoding bit-rate of 140 kbps. Ten other "Users" are already connected to the "Video Streaming Server", seven of which are watching "videofile1" and three of which are watching "videofile2". The maximum available bandwidth is X=10 Mbps=10000 Kbps. We set the threshold 20%.

From formula (F.1), we have the following:

Number of users: U=10

7 users watching "videofile1": B1=220, B2=220, B3=220, B4=220, B5=220, B6=220, B7=220

3 users watching "videofile2": B8=140, B9=140, B10=140

Thus, the total bandwidth consumed is:

$$N = B1 + B2 + B3 + B4 + B5 + B6 + B7 + B8 + B9 + B10$$
$$= 220 + 220 + 220 + 220 + 220 + 220 + 220 + 140 + 140 + 140$$
$$= 1960$$

$N_{TOTAL} = 1960 kbps$

As set out above, the maximum available bandwidth X=10000 kbps

From formula (F.2):

$$A = [(X - N)/X] * 100\%$$
$$= [(10000 - 1960)/10000] * 100\%$$
$$= 80.4\%$$

so A=80.4%

Conclusion: The remaining available "up-link" bandwidth is 80.4%, above the threshold of 20%. So this server is capable of accepting requests for more "video streams" and it's "average response time" from Step 3, will be included in the final "best Video Streaming Server" decision.

It should be noted that alternative way of calculating the "remaining capacity" exist, such as the following. A program could be running continuously on the Server or other such Data provider which is capable of measuring the packets (TCP/UDP) sent out over a period of time, thus measuring the "Average up-link capacity". Such programs are widely available and would give an estimate of the traffic to and from the Data Provider. Such processes may be more complicated than that described above, but may be capable of providing a more accurate measurement of the instantaneous average remaining bandwidth, and may also measure not only any "multimedia packets", but also any other traffic (TCP acknowledgement messages, overhead packets, traffic from other network applications etc). Such methods would in general run continually on the "Data Provider", while the one described in detail above need be initiated only when the "bandwidth measurement" is required.

Step 4a (not shown in FIG. 1): Once the above value has been established, the percentage of available "up-link" bandwidth may be returned to the RMI Client 26 of the Centralised Server 20 by each Video Streaming Server 30. Once the "Pinging" process (Step 3 of the "Latency Test") has also been completed in relation to each machine, a table with average response time values and percentage values may be formed in the "RMI Client" (see Table 2 below). If the percentage of available "up-link" bandwidth of any Video Streaming Server is below a predetermined "threshold", that Server may be disqualified irrespective of its response time value. From those that are not disqualified, the one with the smallest average response time value (i.e. "C1" in this example) may be chosen as the most suitable (or "best") Video Streaming Server.

TABLE 2

This shows the "Average response time" values retrieved from all "Video Streaming Servers" with RMI technology, together with the percentage of available up-link bandwidth values. The "RMI Client" may pick the Server having the smallest response time value that is not disqualified on account of having a percentage value below the predetermined threshold of 20%. Note that the $n^{th}$ server (Cn) seems "congested", so its "average response time" value, although very low, will be rejected from the final decision.

| IP address (Video Streaming Server) | Average response time (milliseconds) | Available "up-link" bandwidth (%) |
| --- | --- | --- |
| C1: 132.146.107.61 | 57 ms | 80.4% |
| C2: 132.146.107.124 | 100 ms | 94% |
| Cn: 132.146.107.16 | 54 ms | 15% (rejected) |

Step 5 (shown in FIG. 1): The "Servlet" will retrieve from the "RMI Client", the IP address of the preferred Video Streaming Server, and it will update the web page containing the video links with that new IP address. In this way, the "Centralised" server may redirect the client to that "multimedia" Server, via JAVA "Servlet" technology.

This is the end of the test, by virtue of which the user will be able to receive video streaming content from the "best" Video Streaming Server.

The process can be repeated for a fixed period of time, set by the "Video Server" administrator, and each time, the web page can be dynamically refreshed with a new "Video Streaming Server IP address".

Study of Special Cases:

Below, we briefly review some specific situations which may disrupt the above processes:

RMI server is "down": In this case, the RMI Client may not be able to establish communication with the RMI Server of a particular Video Streaming Server. It may thus assume that this "Server" is currently not working. Thus, this "Server" will not be taken into account in the decision of which "Video streaming Server" is the "best".

User/Client is behind firewall: In this special case, there is a possibility that the Client's machine blocks all "Ping" packets, resulting in all servers receiving "request time out responses". In this case, the end-user may be offered a default "Video Streaming Server" and may be informed about this event (i.e. that he is behind a firewall and should deactivate the blocking of ICMP packets). Alternatively, other processes may be automatically initiated to tackle this case.

"Video Streaming Server" is "down": In this case, the RMI Server may check if the video streaming software is working and may inform the "RMI Client" if or when that "Video Streaming Server" is ready to receive connections. Alternatively, in Step 4, this "Server" may be excluded from the process of establishing which "Video Streaming Server" is the "best".

What is claimed is:

1. System for selecting a preferred data provider from a plurality of data providers, the system comprising:

means for receiving a request for data from a client;

means for receiving client identification data from said client;

means for identifying a plurality of data providers having, or having access to, data in respect of which a request has been received from said client;

means for providing said client identification data to said data providers;

means for instructing said data providers to perform the following steps without requiring said client to install or execute additional software at said client:

(i) sending a test signal to said client;

(ii) receiving a return signal from said client;

(iii) obtaining a measure of the elapsed time between the sending of the test signal and the receipt of the return signal;

(iv) making a signal indicative of the elapsed time available to the system; and v) making a signal indicative of their remaining capacity available to the system;

means for receiving elapsed time signals and remaining capacity signals from said data providers;

means for selecting a preferred data provider from said plurality of data providers on the basis of said signals; and means for providing information relating to the identity of said preferred data provider to said client.

2. A system according to claim 1, wherein the means for receiving a request for data comprises means for receiving a request for one or more specific items.

3. A system according to claim 2, wherein the means for identifying data providers comprises means for searching for data providers capable of providing the specific item or items requested.

4. A system according to claim 1, wherein the selecting means is arranged to select a preferred data provider from data providers having a remaining capacity above a predetermined threshold.

5. A system according to claim 1, wherein the means for instructing said data providers comprises means for instructing the data providers to make available to the system a signal indicative of their remaining bandwidth.

6. A system according to claim 1, wherein the means for instructing said data providers is a means remote from the client.

7. A system according to claim 1, wherein the means for providing information relating to the identity of the preferred data provider is arranged to provide said information on a web site.

8. A system according to claim 1, wherein the means for providing information relating to the identity of the preferred data provider is arranged to provide the Uniform Resource Locator (URL) of said preferred data provider.

9. A system according to claim 1, comprising means capable of selecting more than one preferred data provider according to predetermined criteria, and means for providing information relating to the identity of each preferred data provider to the client.

10. Method for selecting a preferred data provider from a plurality of data providers, the method comprising:
   receiving a request for data from a client;
   receiving client identification data from said client;
   identifying a plurality of data providers having, or having access to, data in respect of which a request has been received from said client;
   providing said client identification data to said data providers;
   instructing said data providers to perform the following steps without requiring said client to install or execute additional software at said client:
      (i) sending a test signal to said client;
      (ii) receiving a return signal from said client;
      (iii) obtaining a measure of the elapsed time between the sending of the test signal and the receipt of the return signal;
      (iv) making a signal indicative of the elapsed time available to the system; and
      (v) making a signal indicative of their remaining capacity available to the system;
   receiving elapsed time signals and remaining capacity signals from said data providers;
   selecting a preferred data provider from said plurality of data providers on the basis of said signals; and
   providing information relating to the identity of said preferred data provider to said client.

11. A method according to claim 10, wherein the step of receiving a request for data comprises receiving a request for one or more specific items.

12. A method according to claim 11, wherein the step of identifying data providers comprises searching for data providers capable of providing the specific item or items requested.

13. A method according to claim 10, wherein the step of selecting a preferred data provider comprises selecting from data providers having a remaining capacity above a predetermined threshold.

14. A method according to claim 10, wherein the step of instructing said data providers comprises instructing the data providers to make available to the system a signal indicative of their remaining bandwidth.

15. A method according to claim 10, wherein the step of instructing said data providers is carried out by means remote from the client.

16. A method according to claim 10, wherein the step of providing information relating to the identity of the preferred data provider comprises providing said information on a web site.

17. A method according to claim 10, wherein the step of providing information relating to the identity of the preferred data provider comprises providing the Uniform Resource Locator (URL) of said preferred data provider.

18. A method according to claim 10, wherein more than one preferred data provider may be selected according to predetermined criteria, and wherein information relating to the identity of each preferred data provider may be provided to the client.

* * * * *